United States Patent

Follstaedt et al.

[15] 3,635,391
[45] Jan. 18, 1972

[54] INTERNAL BEAD FORGING DEVICE FOR CONTINUOUS WELDED TUBE MILL

[72] Inventors: Donald W. Follstaedt; Robert S. Burns, both of Middletown, Ohio

[73] Assignee: Armco Steel Corporation, Middletown, Ohio

[22] Filed: May 7, 1970

[21] Appl. No.: 35,330

[52] U.S. Cl. ........................228/24, 228/17, 228/19
[51] Int. Cl. .......................................................B23k 19/00
[58] Field of Search ...............228/19, 15, 17, 24; 219/62, 219/6; 29/33 D; 113/116; 90/24 B

[56] References Cited

UNITED STATES PATENTS

| 509,442 | 11/1893 | Moore | 228/24 |
| 1,436,062 | 11/1922 | Sussman | 228/24 |
| 1,884,467 | 10/1932 | Windsor | 228/19 X |
| 2,036,673 | 4/1936 | Anderson | 228/24 X |

Primary Examiner—John F. Campbell
Assistant Examiner—R. J. Craig
Attorney—Melville, Strasser, Foster & Hoffman

[57] ABSTRACT

A forging assembly for the continuous flattening of the longitudinal, internal weld bead of small diameter tubing produced by a continuous tube mill. The forging assembly comprises a support roll for the tubing, a mandrel mounted within the tubing, and forging means adapted to impart periodic, overlapping blows so as to flatten the internal bead against the mandrel. The forging means comprises a plurality of planetary forging rolls carried by a roll cage rotatively mounted on a driven race. There is a time delay between each contact of the tube by a forging roll, sufficient to enable the mandrel to engage a new portion of the bead for forging.

15 Claims, 5 Drawing Figures

PATENTED JAN 18 1972
3,635,391
SHEET 1 OF 2
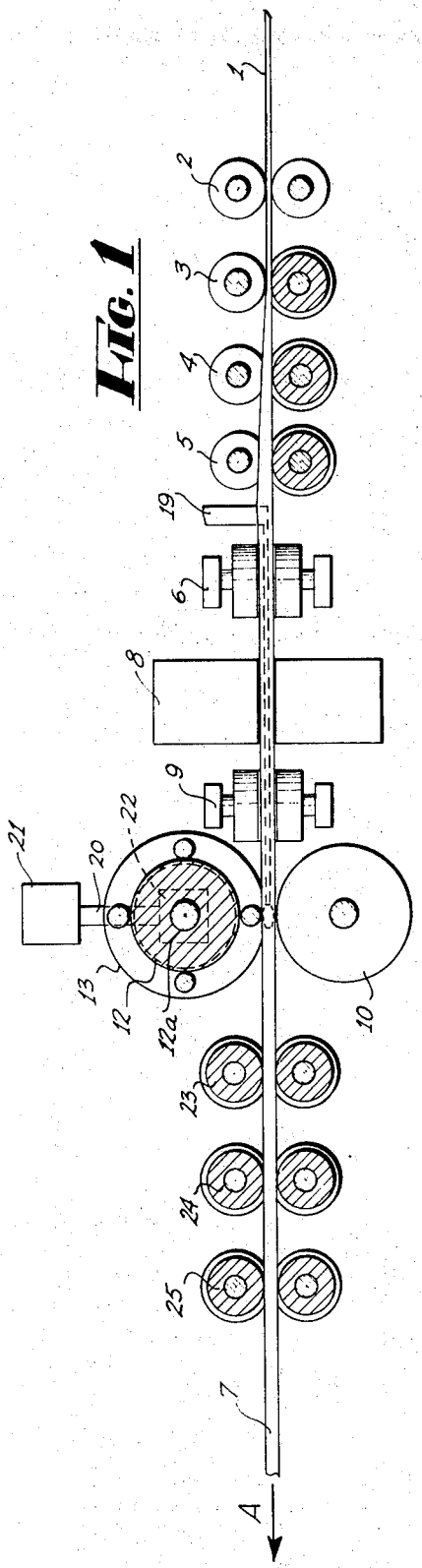
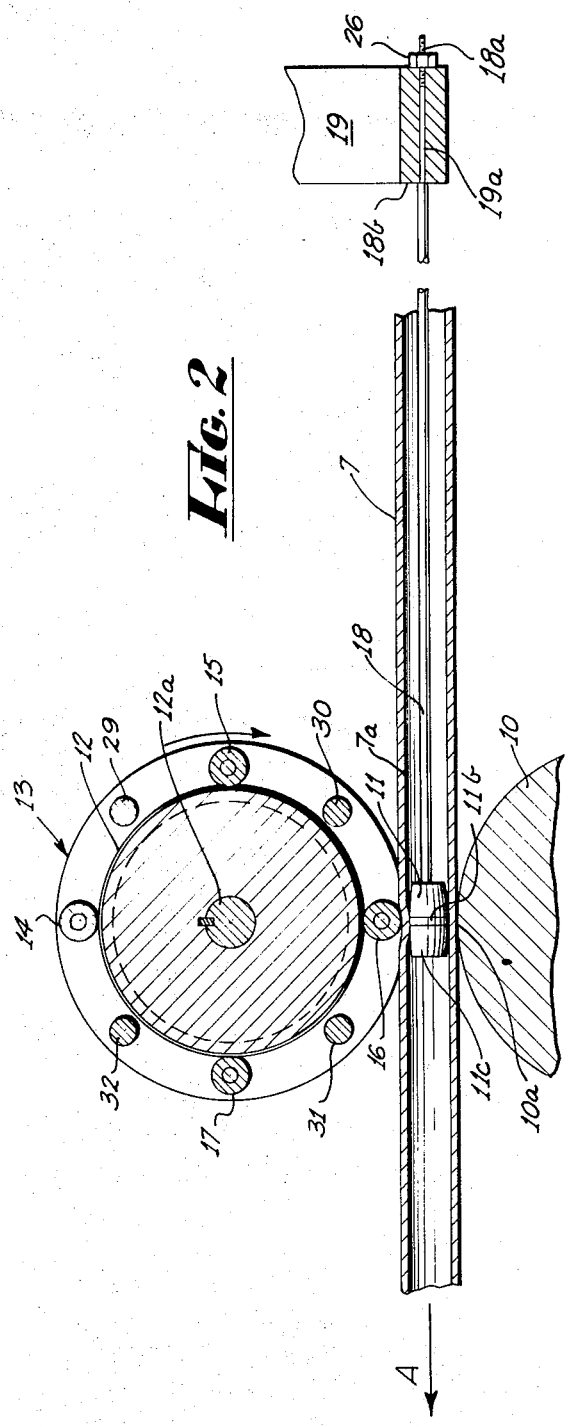
INVENTOR/S
DONALD W. FOLLSTAEDT &
ROBERT S. BURNS,
BY Melville, Strasser, Foster and Hoffman
ATTORNEYS

INTERNAL BEAD FORGING DEVICE FOR CONTINUOUS WELDED TUBE MILL

BACKGROUND OF THE INVENTION

1. Field of the Invention

The invention relates to an improved forging assembly for the flattening of the longitudinal weld bead in the interior of welded tubing, and more particularly to a forging assembly for use with small diameter welded tubing.

2. Description of the Prior Art

In the usual practice wherein flat strip is continuously passed through roll stands which bend the strip into tubular form having a longitudinal seam, the seam is welded by a continuous welding device, producing both an internal and an external bead along the welded seam. The external bead, being readily accessible, is relatively easily removed or flattened by a number of well-known expedients, such as planing, grinding, or passing the tubing through a reducing stand. Under some circumstances, the removal of the external bead (as by flattening or the like) will increase the size of the internal bead.

When the tube is made of sufficiently soft material and has a sufficiently large internal diameter, the internal bead can also be removed by rolling or the like. Prior art workers have developed means carrying one or more flattening rolls which may be located within the tubing when the diameter is sufficiently large and which will flatten the internal bead in tubing made of hard material such as stainless steel or the like. However, considerable difficulty is encountered when the internal weld bead is to be removed from tubing of stainless steel or other hard material, having an internal diameter of 1½ inches or less. Under such circumstances, the internal diameter of the tubing is too small to permit the use of internally located flattening rolls.

When the tubing is of hard material and small internal diameter, prior art workers have turned to the use of an internal anvil within the tube and means for imparting blows to the exterior of the tube against the anvil so as to flatten the internal bead. In some instances, hammer means have been used to impart the blows against an axially movable anvil, as is exemplified in U.S. Pat. No. 2,712,249, in the name of W. Siegerist, and entitled "Machine For Flattening Internal Beads In Welding Tube." Hammer-type devices have, however, been characterized by a very complex construction.

Prior art workers have also employed work rolls to impart periodic blows to the external surface of tubing. In general, the work rolls are journaled in a driven rotating frame or cage. U.S. Pat. No. 1,436,062, in the name of M. H. Sussman, and entitled "Apparatus For Welding Joints," is exemplary of this construction. Such an assembly, however, requires full capacity bearings on each work roll, capable of withstanding the full force on the work rolls during the forging operation.

The present invention is directed to a planetary-type forging means for a forging assembly wherein a plurality of planetary forging rolls is rotatively mounted in a roll cage. The roll cage, in turn, is rotatively mounted on a driven race. It has been discovered that such a structure may be made more compact while maintaining the ability to deliver blows with the same force as more bulky prior art structures. The number of impacts per given length of tubing may be readily varied, as may be the number of rolls in the roll cage. There is no need to provide full capacity bearings for each of the forging rolls since they are backed by the race. Finally, the forging means of the present invention displays smoother running characteristics than prior art forging devices.

SUMMARY OF THE INVENTION

The present invention contemplates a forging assembly for flattening an internal, longitudinal weld bead in tubing, and particularly tubing of small diameter. The forging assembly is continuous in action and may constitute a part of a continuous welded tube mill.

The forging assembly comprises a support roll contacting the exterior of the tube opposite the longitudinal weld seam. The support roll may be an idler roll, or it may be driven so as to have the same surface speed as the continuously moving tube. A mandrel is located within the tube. The mandrel has an appropriate work surface thereon and, in its normal position, the work surface of the mandrel is located above the tangent point between the tube and the support roll. The mandrel is normally mounted on a fixed support although an axially movable anvil as shown in U.S. Pat. No. 2,712,249 may be used.

On the opposite side of the tube from the support roll, there is located a forging means which includes a driven race. The axis of the race shaft is parallel to the axis of the support roll shaft and lies in a plane perpendicular to the tube axis. The race supports a plurality of forging rolls which are located in a cage. The forging rolls are freely rotatable on the race and carry the roll cage with them as they roll.

The race is rotated at such a speed that successive impacts from the individual planetary forging rolls will produce overlapping deformations in the tube as it passes through the forging assembly. The planetary rolls depress the tube surface in an elastic manner so as to flatten the internal weld bead against the work surface of the mandrel. As a planetary forging roll contacts the exterior surface of the tube and depresses it so that the interior weld bead will contact the mandrel, the mandrel will deform the interior bead to essentially match the curvature of the tube.

BRIEF DESCRIPTION OF THE DRAWINGS

FIG. 1 is a semidiagrammatic representation of a continuous mill for the production of welded tube, and includes the forging assembly of the present invention.

FIG. 2 is a fragmentary cross-sectional elevation of the forging assembly of the present invention.

DESCRIPTION OF THE PREFERRED EMBODIMENTS

Figure 3:
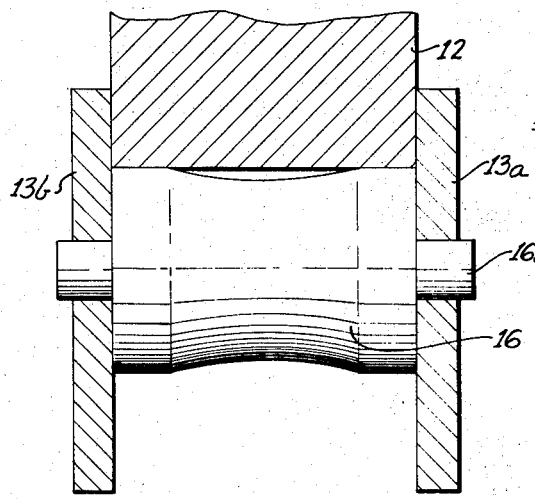
FIG. 3 is a fragmentary view, with parts in cross section, illustrating the race and the roll cage.

FIG. 1 is a semidiagrammatic representation of a tube mill for the continuous production of welded tube of the type having a continuous longitudinal weld seam. Flat metallic strip material 1 is caused to pass through a series of roll stands, generally indicated at 2 through 6. The number and nature of the roll stands does not constitute a limitation on the present invention and are well within the skill of the worker in the art. The roll stands 2 through 6 bend the flat strip 1 into a tubular configuration, generally indicated at 7. By the time the tubing exits the final forming roll stand 6, it will have a substantially circular configuration with a longitudinally extending seam closed by the rolls of roll stand 6.

Thereafter, the longitudinal tube seam is welded by a continuous welding means 8. Again, the nature of the welding means 8 does not constitute a limitation on the present invention, the welding being accomplished by any suitable process known in the art, such as resistance welding, the gas shielded metal arc process, or the like.

As indicated above, the welding process will form both an external and an internal bead along the longitudinal welded seam of the tube. The external bead, being readily accessible, may be removed or flattened by any suitable means. For example, when the nature of the tube material will permit, the bead may be removed by a planing tool or a grinding means. When the tube material is very strong or tough, such as in the case of stainless steel or the like, the external bead may be flattened by passing the tube through a reducing or sizing stand. Such a reducing or sizing stand is generally indicated at 9 in FIG. 1.

Next, the tube passes through the forging assembly of the present invention for the removal of the internal weld bead. Briefly, the forging assembly comprises a support roll 10, an internal mandrel 11, and a forging means which includes a race 12, a roll cage 13 and planetary forging rolls 14–17.

The mandrel 11 is supported by elongated means 18, affixed to bracket 19. The forging rolls 14–17 are freely rotatable in the cage 13. The cage, in turn, is freely rotatable on the race 12. The race shaft 12a is connected to the shaft 20 of a motor means 21 through a conventional transmission means, shown in dotted lines at 22. It will be understood by one skilled in the art that the means and manner by which the race is driven does not constitute a limitation on the present invention. For example, the race shaft may be connected to the shaft of a prime mover by chain means, belt means, or the like. In any event, it is preferable to have means whereby the speed of rotation of the race may be varied.

After the forging operation, the tube 7 will generally be passed through a plurality of sizing stands for the purpose of achieving the desired final tube diameter. The number and nature of the sizing stands does not constitute a limitation on the invention. For purposes of an exemplary showing, three conventional sizing stands are diagrammatically represented at 23, 24 and 25.

The forging assembly of the present invention is most clearly shown in FIG. 2. Like parts have been given like index numerals. The tube 7 will move continuously in the direction of arrow A. The tube 7 will be supported by support roll 10, which is preferably concave to match the radius of the tube. The support roll 10 may be an idler roll, or it may be driven so as to have a surface speed equal to the speed of the tube 7. This would prevent slippage between the tube 7 and the support roll.

FIG. 2 also most clearly illustrates the mandrel 11. The mandrel 11 will have a tapered end 11a and a cylindrical work surface 11b. The other end 11c of the mandrel may also by cylindrical and constitute a continuation of the work surface 11b, or it may be tapered in the manner shown with respect to end 11a so that the mandrel may be reversed end for end for longer like. The work surface 11b will have a diameter smaller than the internal diameter of the tube 7 by an amount equal to the maximum thickness of the internal weld bead 7a plus clearance, so that the mandrel may readily slide within the continuously moving tube.

The mandrel may be made of any suitable hard and wear-resistant material. Excellent results have, for example, been achieved with a tungsten carbide mandrel.

In FIG. 2, the mandrel 11 is illustrated in its normal position. In this position, the work surface 11b of the mandrel overlies the tangent point 10a between the support roll 10 and the tube 7. The mandrel is held in this position by an elongated means 18. In this instance, the elongated means is illustrated as being a rod. It will be understood by one skilled in the art that a cable and other elongated means could be used.

The mandrel 11 is affixed to one end of the rod 18 in any suitable manner (not shown). For example, the end of the rod may be threaded and received in a threaded perforation in the mandrel. Alternatively, a reduced diameter portion of the rod may extend through the mandrel with a bolt or other fastening means on the free end thereof. The other end of the rod 18 is affixed to bracket means 19. The bracket 19 may be fastened to any stationary object (not shown). As will be evident from FIG. 1, the bracket 19 is located ahead of roll stand 6, the roll stand which closes the longitudinal seam in the tube 7.

The rod 18 is illustrated as having a reduced portion 18a passing through perforation 19a in the bracket 19. The reduced portion 18a is threaded to receive a nut 26. The shoulder 18b on the rod 18 is held against the bracket 19 by tightening the nut 26. Thus, the mandrel 11 is held in its proper location except for possible elastic elongation of the rod 18 during periods of impact.

The race 12 is clearly shown in FIGS. 2 and 3. The race is nonrotatively affixed to a race shaft 12a. The axis of the race shaft is parallel to the axis of the shaft 10b of the support roll 10 and lies in a plane perpendicular to the axis of the tubes (see FIG. 1).

Figure 4:
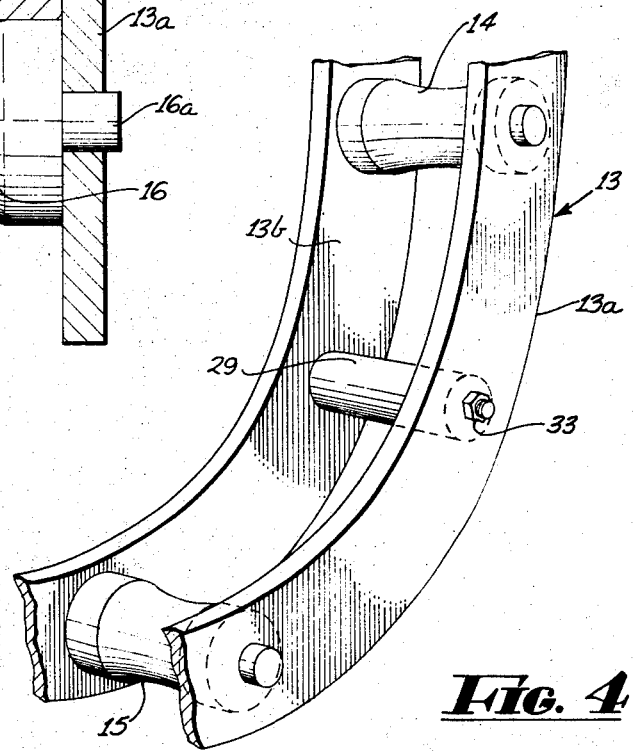
FIG. 4 is a fragmentary perspective view of the roll cage and illustrates the forging rolls and spacer means.

The race 12 supports the roll cage 13. As will be evident from FIGS. 2, 3 and 4, the roll cage 13 is made up of two circular elements 13a and 13b. The elements 13a and 13b are held in spaced relationship by a plurality of spacer means, four of which are shown at 29–32 in FIG. 2. It will be understood by one skilled in the art that any appropriate type and any appropriate number of spacer means may be used, so long as they are uniformly arranged between the circular cage elements 13a and 13b. For purposes of an exemplary showing, the spacer means 29 is illustrated in FIG. 4 as comprising a rodlike member. The ends of the rodlike member are of reduced diameter and pass through perforations in the elements 13a and 13b. The end portions extending beyond the elements 13a and 13b are adapted to receive fastening means such as the nut 33. It is preferable that the spacer means be detachable from at least one of the circular members 13a and 13b so that the roll cage may be disassembled for purposes of changing the number of rolls and replacing worn rolls.

FIG. 3 shows forging roll 16 having a shaft 16a. The end of the shaft pass through perforations in the circular cage elements 13a 13b. The roll 16, itself, is backed by the race 12 so that full capacity bearings need not be provided for roll shaft 16a.

It will be understood by one skilled in the art that the remainder of the forging rolls will be mounted in the same way as shown with respect to roll 16. Additional coaxial holes may be provided in and evenly spaced about roll cage elements 13a and 13b so that additional forging rolls may be added to the roll cage as described.

It will be noted that the circular elements 13a and 13b of the roll cage are so sized as to overlap the sides of the race 12. Thus, although the roll cage assembly is freely rotatable about the race 12, it is captively held thereon by virtue of the above-mentioned overlap.

The operation of the forging assembly of the present invention may be described as follows. The tube 7 will move smoothly and continuously through the forging assembly, the support roll 10 rotating at the same surface speed as the tube.

As the tube 7 passes through the forging assembly, the race 12 will be driven by the prime mover 21. The race may be driven in either rotational direction. For purposes of an exemplary showing, it may be assumed that the race is driven in a clockwise direction, as viewed in FIG. 2. As a consequence, the roll cage 13 will tend to revolve about the race in a clockwise direction, and the forging rolls 14–17 will tend to revolve in a counterclockwise direction. The race is driven at such a speed that the successive impacts of the individual planetary rolls on the tube 7 will produce overlapping deformations in the tube as it moves forwardly. Thus, the rotational speed of the race will depend upon the number of planetary forging rolls provided, the diameter of the race and the size of the work surface 11b on the mandrel, and the speed of the tube.

Figure 5:
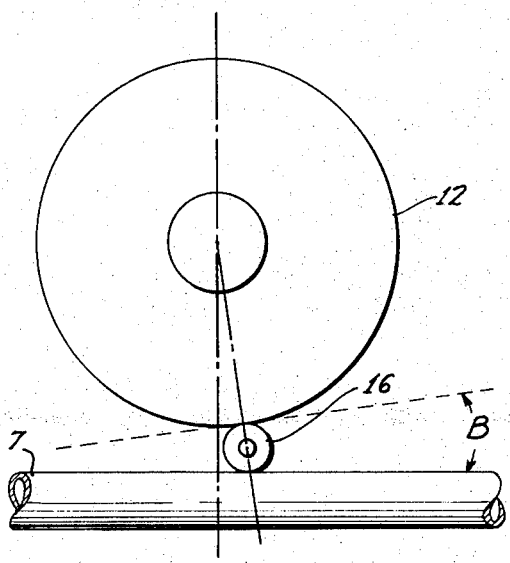
FIG. 5 is a fragmentary diagrammatic representation of the race, one of the planetary forging rolls and the tube, and illustrates the entry angle of the planetary forging roll.

The diameter of the race 12 and the diameter of the planetary forging rolls must be selected so that the entry angle of the forging rolls is 15° or less. This insures that the planetary forging rolls will enter the space between the race and the tube 7. Otherwise, the leading one of the forging rolls would simply slide with respect to the race and the tube, remaining stationary at the point where it was tangent with both. This is illustrated in FIG. 5 wherein like parts have been given like index numerals. The angle of entry B is that angle formed between the surface of the tube 7 and the tangent between the forging roll 16 and the race 12 when the forging roll first contacts both the race and the tube surface. Thus, angle B should be 15° or less.

The rotational speed of the race need not be synchronized with the forward speed of the tube 7 since the roll cage and the planetary forging rolls will assume the proper orbital velocity of their own accord. Thus, the number of impacts imparted to the tube by the forging rolls can be varied by changing the rotational speed of the race or the speed of the tube 7. The cage and the forging rolls will be self-synchronizing. The planetary forging rolls will assume the same surface speed as the race thereby preventing slippage therebetween.

It is necessary that the planetary forging rolls contact the tube surface over an area larger than the mandrel work surface 11b, so that the plastic deformation occurs on the inside of the tube. The planetary forging rolls merely depress the tube surface in an elastic manner so as to deform the internal weld bead.

The elastic deformation of the tube is such as to cause it to assume an elliptical cross-sectional configuration. The elastic deformation of the tube is not great in amount, and for purposes of clarity has not been illustrated in FIGS. 1 and 2. Nevertheless, it is preferable that the surfaces of the support roll and the planetary forging rolls which contact the tube will be so shaped as to conform to the elliptical cross-sectional configuration achieved during maximum impact. Since the amount of elastic deformation is small, the concave surfaces on the support roll and the planetary forging rolls can be configured in cross section as arcs of circles approximating the elliptical cross-sectional configuration achieved by the tube.

As one of the planetary forging rolls contacts the exterior tube surface and depresses it, the top and bottom of the mandrel will be engaged by the internal weld bead and the interior surface of the tube, respectively. The race, roll cage, and planetary forging rolls must be so sized and arranged that the tube is contacted by only one forging roll at a time, with a time delay between contacts. This time delay need only be sufficient to enable an undeformed portion of the bead to engage the mandrel. Thus, a forging operation is achieved instead of drawing as would occur if constant pressure were applied by the forging rolls.

In accordance with the above description, and by virtue of the face that successive blows to the tube are overlapping, it will be understood that the forging assembly of the present invention will uniformly flatten the internal weld bead to conform to the internal diameter of the tube. While not so limited in its use, the forging assembly of the present invention is particularly advantageous for the flattening of internal weld beads in tubes having an internal diameter of 1½ inches or less.

Modifications may be made in the invention without departing from the spirit of it. For example, it is within the scope of the present invention to provide a work surface on both the top and bottom of the anvil which will approximate the maximum elliptical cross-sectional configuration achieved by the interior surface of the tube during impact.

The embodiments of the invention in which an exclusive property or privilege is claimed are defined as follows:

1. A continuous acting forging assembly for flattening an internal, longitudinal weld bead in tubing, which comprises:
   a. a support roll contacting the exterior surface of the tube opposite the longitudinal weld seam;
   b. a mandrel located within the tube, said mandrel having a work surface thereon which in its normal position overlies the tangent point between said support roll and the tube; and
   c. forging means including
      i. a driven race on the opposite side of said tube from said support roll, the axis of said race being substantially parallel to the axis of said support roll and lying in a plane perpendicular to the axis of said tube;
      ii. a roll cage supported by said race, said roll cage being freely rotatable about said race but captively held thereon;
      iii. a plurality of planetary forging rolls located in said cage, said forging rolls being freely rotatable on said race and carrying said roll cage therewith; and
      iv. means to rotate said race at such a speed that successive impacts from said forging rolls will produce overlapping deformation in said tube as it passes through said forging assembly; whereby as said forging rolls contact the exterior surface of said tube and depresses it in an elastic manner, said mandrel will deform and flatten the internal weld bead of said tube so that it substantially conforms to the inside diameter of said tube.

2. The forging assembly according to claim 1, wherein said support roll comprises an idler roll.

3. The forging assembly according to claim 1, wherein said support roll is rotated at the same surface speed as said tube so as to prevent slippage between said tube and said support roll.

4. The forging assembly according to claim 1, wherein said mandrel is mounted on a fixed support.

5. The forging assembly according to claim 1, wherein said mandrel comprise an axially movable anvil.

6. The forging assembly according to claim 1, wherein said mandrel is provided with a tapered end and said work surface is cylindrical and provided with a diameter smaller than the internal diameter of said tube by an amount equal to the maximum thickness of the internal weld bead plus clearance, whereby said tube may readily slide over said mandrel.

7. The forging assembly according to claim 6, wherein said mandrel is made of tungsten carbide.

8. The forging assembly according to claim 6, wherein the other end of said mandrel is also cylindrical and constitutes a continuation of said work surface.

9. The forging assembly according to claim 6, wherein the other end of said mandrel is tapered so that said mandrel may be reversed end for end for longer life.

10. The forging assembly according to claim 6, wherein said mandrel is positioned within said tube by an elongated rod, one end of which is received in said mandrel and the other end of which is affixed to bracket means.

11. The forging assembly according to claim 1, wherein said roll cage comprises two circular elements which are held in spaced relationship by a plurality of spacer means uniformly arranged therebetween, and wherein said circular elements overlap the sides of said race, whereby said roll cage is freely rotatable about said race but is captively held thereon by said overlap.

12. The forging assembly according to claim 1, wherein the diameter of said race and the diameter of said forging roll are selected so that the angle formed between the exterior surface of said tube and the tangent between one of said forging rolls and said race when said forging roll first contacts both said race and the exterior surface of said tube does not exceed substantially 15°, whereby to insure that said forging rolls will enter the space between said race and said tube.

13. The forging assembly according to claim 12, wherein said forging rolls contact the exterior surface of said tube over an area larger than the work surface of said mandrel so as to ensure that plastic deformation occurs on the inside surface of said tube.

14. The forging assembly according to claim 13, wherein said race, said roll cage and said forging rolls are sized and arranged so that said tube is contacted by only one of said forging rolls at a time, with a time delay between contacts, to enable an undeformed portion of said internal bead to engage said mandrel.

15. In a tube mill for the continuous production of welded tubing having an internal, longitudinal weld bead, of the type having a plurality of roll stands for bending flat metallic strip material into a tubular configuration with a longitudinally extending seam, continuous welding means for welding said longitudinal tube seam, and a forging assembly for removing the internal weld bead from said longitudinal tube seam, the improvement in combination therewith, wherein said forging assembly comprises:
   a. a support roll contacting the exterior surface of the tube opposite the longitudinal weld seam;
   b. a mandrel located within the tube, said mandrel having a work surface thereon which in its normal position overlies the tangent point between said support roll and the tube; and
   c. forging means including i. a driven race on the opposite side of said tube from said support roll, the axis of said race being substantially parallel to the axis of said support roll and lying in a plane perpendicular to the axis of said tube;

ii. a roll cage supported by said race, said roll cage being freely rotatable about said race but captively held thereon;

iii. a plurality of planetary forging rolls located in said cage, said forging rolls being freely rotatable on said race and carrying said roll cage therewith; and iv. means to rotate said race at such a speed that successive impacts from said forging rolls will produce overlapping deformation in said tube as it passes through said forging assembly;

whereby as said forging rolls contact the exterior surface of said tube and depress it in an elastic manner, said mandrel will deform and flatten the internal weld bead of said tube so that it substantially conforms to the inside diameter of said tube.

* * * * *